United States Patent Office 2,779,146
Patented Jan. 29, 1957

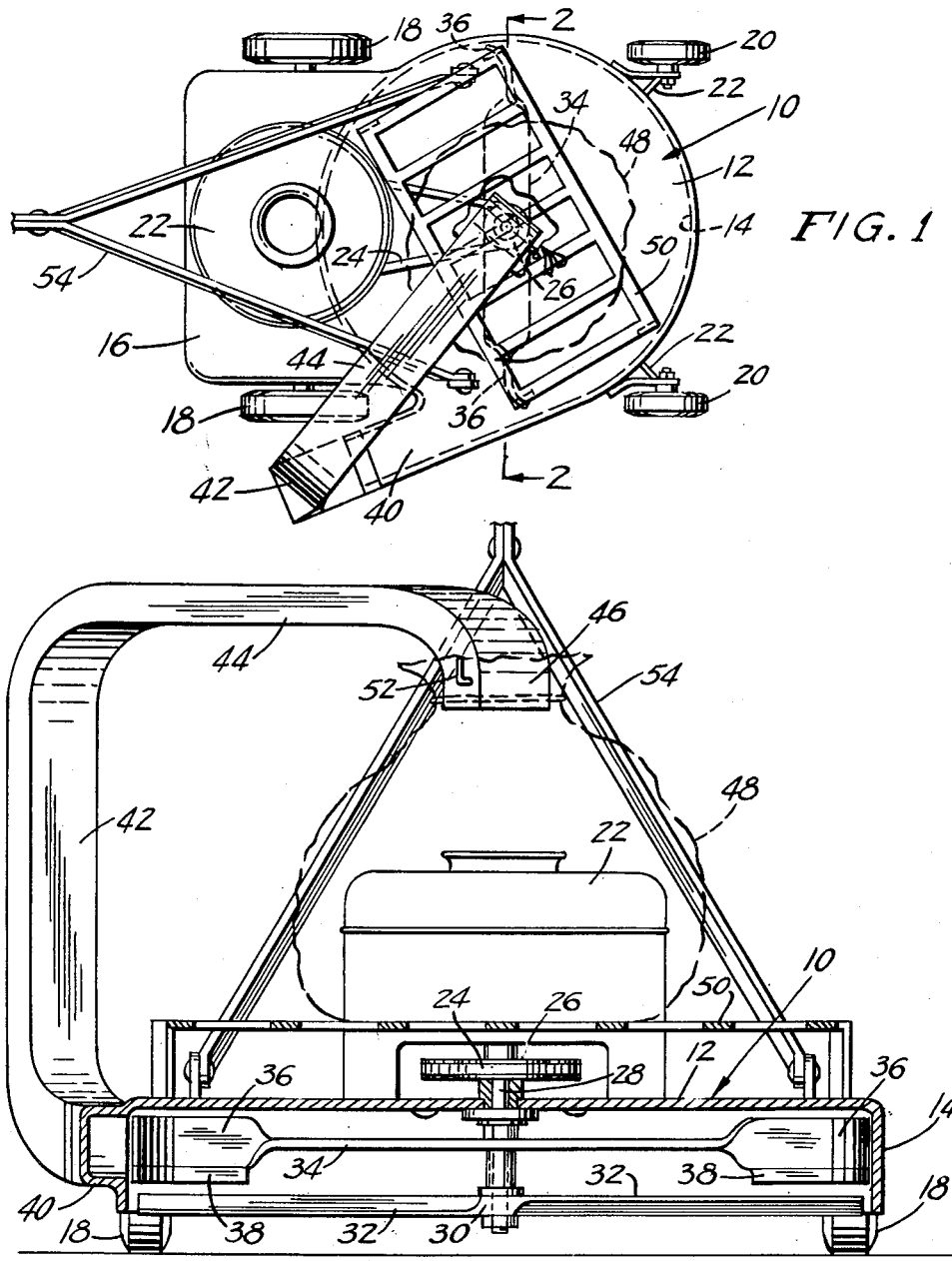

2,779,146
COMBINATION ROTARY MOWER AND LAWN SWEEPER

Robert E. Mitchell and Kent C. Mitchell, Picayune, Miss.

Application November 1, 1955, Serial No. 544,278

3 Claims. (Cl. 56—25.4)

This invention relates generally to power lawn mowers of the so-called rotary type, and more particularly has reference to structure falling within this general category having incorporated therein lawn sweeping means.

The main object of the present invention is to provide an improved combination structure as described, which will be so designed that the grass cuttings resulting from mowing of the grass by the rotating cutter blade will be blown into a duct projecting from the blade housing and will pass out of said duct into a bag or other container carried by the mower. In this way, all the cuttings will be disposed of properly, without falling to the grass, and may, for example, be used for purposes of making compost or alternatively, may be disposed completely.

Another object of importance is to provide a mower as described which will be so designed as to be usable as a lawn sweeper, so as to sweep up not only grass cuttings, but also leaves.

Yet another object of importance is to provide a device of the nature referred to that will be of compact design, will be capable of construction at relatively little cost above that presently required for manufacture of a rotary mower not having the desirable features of the invention incorporated therein, will be wholly efficient in operation, and will be designed in such a manner that the means for sucking up and disposing of the grass cuttings will not interfere in any way with the operation of the cutting blade.

Other objects will appear from the following description, the claims appended thereto, and from the annexed drawing, in which like reference characters designate like parts throughout the several views, and wherein:

Figure 1 is a top plan view of a combination mower and sweeper formed according to the present invention, the handle being shown fragmentarily; and Figure 2 is an enlarged transverse sectional view on line 2—2 of Figure 1.

The device constituting the present invention includes a horizontally disposed, circular, downwardly opening blade housing generally designated 10 including a flat, large diameter cover plate 12 lying in a horizontal plane and integral at its periphery with a depending guard flange 14 extending through the full circumference of the housing, except where the housing is provided with an outlet into a duct to be described hereinafter.

Integral or otherwise made rigid with the top plane 12, and coplanar with said top plate, is a rearwardly projecting extension plate 16, having transversely aligned openings in its side walls receiving bearings in which is journalled an axle provided at its opposite ends with wheels 18. Front wheels 20 provided upon the device are rotatably mounted upon brackets 22 projecting forwardly from the flange 14.

A motor 22 is mounted upon the extension plate 16, and can be of any desired type without affecting the operation of the mower-sweeper. Secured to the shaft of the motor is a pulley about which is trained a belt 24 passing also about a smaller pulley 26 rotating above the center part of the plate 12 and secured to a vertically disposed shaft 28 journalled in the plate 12. Below the plate 12, at the lower end of shaft 28, there is secured a cutting blade 30 which as shown can have oppositely pitched blade portions 32. Alternatively, the cutting blade can be formed as a wholly planiform length of bar material, rotating and disposed fully within a horizontal plane.

Secured to stub shaft 28 for rotation therewith above the blade 32 is a fan blade 34, the length of which is substantially equal to that of the cutting blade. The blade 34 has a flat intermediate portion lying in a horizontal plane paralleling the plane of rotation of blade 32, and at opposite ends of the fan blade, said intermediate portion is integral with a pair of curved wings 36. To form the fan blade, the end portions of the length of material of which the fan blade is being made are twisted out of the plane of the intermediate portion through 90 degrees, and then said end portions are oppositely curved as shown in Figure 1, with the tips of the end portions or wings 36 trailing in the sense of direction of rotation of the fan blade.

The tips of the wings 36 extend close to the flange 14, and as the grass is cut by the blade 32, the cut-off portions of the blades of grass, above the plane of the blade 32, are caught in the path of the wings 36, said wings 36 during rotation thereof at high speed setting up a suction below the cutting blade, tending to draw the cuttings upwardly with the cuttings then being blown into an outlet duct. The wings 36, preferably, have depending, longitudinal extensions 38 on the bottom edges thereof to increase the transverse or top-to-bottom dimension of the wings, thereby increasing the suction and the force with which the cuttings will be blown into the duct.

Formed integrally with the housing, is a short, tubular duct member 40 communicating at its inner or intake end with the interior of the housing through an opening formed in the flange 14. The member 40 is at the same elevation as the fan blade, and accordingly, the cuttings, leaves, etc. will be blown into the member 40 during rotation of the fan blade with the cutter blade.

The rearwardly curving shape of the end portions 36, in this regard, aid in blowing the cuttings into the member 40, coacting with the disposition of the member 40 substantially tangentially to the circular orbit through which the tips of the wings or fan blade end portions 36 rotate.

Connected to the outlet end of the member 40 is an upwardly projecting duct 42 merging at its upper end into a horizontally disposed duct extension 44 extending radially, inwardly of the fan housing and terminating above the center of the housing in a depending outlet portion 46. A bag or other container 48 is adapted to having its neck engaged about the portion 46, so that the cuttings or leaves will be blown into the bag 46. The bag should be of a mesh such that air blown into the same with the cuttings will be able to pass outwardly through the wall of the bag, while leaving the cuttings and other debris within the bag.

The bag is supported at its lower end upon a rack 50 mounted upon and elevated above the plate 12, said rack being of rectangular outer configuration and being of grate-like construction, with a plurality of cross bars extending between the longitudinal or side bars of the rack as shown in Figure 1.

To aid in supporting the bag upon the outlet end of the duct there are provided upwardly projecting hooks 52 on the opposite side walls of the outlet portion 46 of the duct, adapted to engage in the material of the neck of the bag. Then, a cord can be used to tie the neck of the bag tightly about the outlet portion 46 to prevent cuttings from being blown upwardly out of the bag.

A conventional handle 54 is also provided, said handle being of any desired design and extending rearwardly above the motor, or at opposite sides of the motor, whichever is desired.

It will be seen that the device cannot only be used as a lawn mower, but can also be used as a lawn sweeper, used to clear a lawn of accumulated leaves. The cutting blade 32 in this instance will cut up the leaves into relatively small particles, with said particles then being sucked into the path of the fan blade and blown through the duct into the bag.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In a combination rotary mower and lawn sweeper of the type including a horizontally disposed, downwardly opening, rollably supported blade housing having a cover plate lying in a horizontal plane and rigid at its periphery with a depending guard flange, said guard flange having an outlet formed therein, the improvement comprising: a vertical shaft journalled in the housing; a cutting blade secured to the shaft within the housing for rotation in a horizontal plane falling substantially at the lower edge of the guard flange, said outlet extending substantially the full distance between the planes of the cover plate and blade; and a fan blade secured to the shaft above the cutting blade and formed at its ends with oppositely curving wings, each of said wings being curved solely on a horizontal radius, the tips of the wings being trailing in the sense of direction of rotation of the fan blade and being spaced closely from the flange, said wings being substantially coextensive in height with the outlet whereby cuttings resulting from rotation of the cutting blade will immediately be disposed directly in the path of rotation of the wings, so as to be directed radially outwardly of the housing through the outlet in a horizontal path disposed between the planes of the cover plate and cutting blade.

2. In a combination rotary mower and lawn sweeper of the type including a horizontally disposed, downwardly opening, rollably supported blade housing having a cover plate lying in a horizontal plane and rigid at its periphery with a depending guard flange, said guard flange having an outlet formed therein, the improvement comprising: a vertical shaft journalled in the housing; a cutting blade secured to the shaft within the housing for rotation in a horizontal plane falling substantially at the lower edge of the guard flange, said outlet extending substantially the full distance between the planes of the cover plate and blade; a fan blade secured to the shaft above the cutting blade and formed at its ends with oppositely curving wings, each of said wings being curved solely on a horizontal radius, the tips of the wings being trailing in the sense of direction of rotation of the fan blade and being spaced closely from the flange, said wings being substantially coextensive in height with the outlet whereby cuttings resulting from rotation of the cutting blade will immediately be disposed directly in the path of rotation of the wings, so as to be directed radially outwardly of the housing through the outlet in a horizontal path disposed between the planes of the cover plate and cutting blade; and a duct connected at one end to the outlet, said duct being formed with a portion projecting upwardly from the outlet in laterally spaced relation to the housing, said duct further being formed, at the upper end of the upwardly projecting portion, with a duct extension extending from said duct portion radially inwardly of the fan housing and terminating above the center of the housing in a depending outlet portion spaced vertically from the center of the cover plate.

3. In a combination rotary mower and lawn sweeper of the type including a horizontally disposed, downwardly opening, rollably supported blade housing having a cover plate lying in a horizontal plane and rigid at its periphery with a depending guard flange, said guard flange having an outlet formed therein, the improvement comprising: a vertical shaft journalled in the housing; a cutting blade secured to the shaft within the housing for rotation in a horizontal plane falling substantially at the lower edge of the guard flange, said outlet extending substantially the full distance between the planes of the cover plate and blade; a fan blade secured to the shaft above the cutting blade and formed at its ends with oppositely curving wings, each of said wings being curved solely on a horizontal radius, the tips of the wings being trailing in the sense of direction of rotation of the fan blade and being spaced closely from the flange, said wings being substantially coextensive in height with the outlet whereby cuttings resulting from rotation of the cutting blade will immediately be disposed directly in the path of rotation of the wings, so as to be directed radially outwardly of the housing through the outlet in a horizontal path disposed between the planes of the cover plate and cutting blade; and a rack mounted upon and elevated above the cover plate for supporting a cuttings receiver disposed in the space between the duct extension and cover plate, said rack being of rectangular outer configuration and having a horizontal, grate-like supporting surface on which said receiver may be disposed.

References Cited in the file of this patent

UNITED STATES PATENTS

| | | |
|---|---|---|
| 1,336,257 | Muzzy | Apr. 6, 1920 |
| 2,295,072 | Blessing | Sept. 8, 1942 |
| 2,513,466 | Fleming | July 4, 1950 |
| 2,547,328 | Koch et al. | Apr. 3, 1951 |
| 2,675,661 | Titzer | Apr. 20, 1954 |